Dec. 23, 1969   G. B. ELLISON   3,485,488
COMBINATION CONVEYOR FEEDER AND LOADER OF SHEET MATERIAL
Filed May 24, 1968   3 Sheets-Sheet 2

INVENTOR
GLEN B. ELLISON

INVENTOR
GLEN B. ELLISON

United States Patent Office 3,485,488
Patented Dec. 23, 1969

3,485,488
COMBINATION CONVEYOR FEEDER AND LOADER OF SHEET MATERIAL
Glen B. Ellison, 918 E. 3rd St.,
Monroe, Mich. 48161
Filed May 24, 1968, Ser. No. 731,962
Int. Cl. B65h 3/12, 5/02
U.S. Cl. 271—3                     3 Claims

ABSTRACT OF THE DISCLOSURE

This invention consists of three horizontally disposed conveyors: a pickup conveyor, a transporting conveyor, and a disposing conveyor. The pickup conveyor has its power driven pulleys directly over the free-turning pulleys of a transporting conveyor which has its power driven pulleys located directly under the free-turning pulleys of the disposing conveyor. Each conveyor is provided with one or more side by side mounted belts. The belts of both the aforesaid pickup conveyor and the aforesaid disposing conveyor being provided with a plurality of openings therein that pass under like openings in rectangular metal boxes located between the conveyor belts. The aforesaid boxes are connected to a vacuum pump, one for each conveyor, the pumps providing a means (by vacuum) of picking up and holding the sheets of material being transmitted by the conveyors until a predetermined time. The aforesaid transporting conveyor has its receiving end provided with hydraulic jacks for adapting that end of the conveyor and the aforesaid pickup conveyor to the varying heights of the stack of sheet material from which each sheet is picked up by this invention.

---

It is the principal object of this invention to provide a combination conveyor feeder and loader of sheet material that will efficiently and economically transfer sheets of material from a stack to a printing press or to any other machine using sheet material or the like.

Another object of this invention is to provide a combination conveyor feeder and loader of sheet material that employs the use of suction to pick up the sheets of material and hold the sheets on conveyors until ready for disposal in a machine.

Another object of this invention is to provide a combination conveyor feeder and loader of sheet material that contains a minimum number of accessible parts that can be adjusted readily or replaced if necessary.

Another object of this invention is to provide a combination conveyor feeder and loader of sheet material that can be adjusted automatically or manually so as to pick up sheets of material from stacks of paper of any height.

Still another object of this invention is to provide a combination conveyor feeder and loader that can be made to take sheet material of any kind and of any size and weight.

These and other objects and features of this invention will more fully appear from reading the following description of this combination conveyor and loader of sheet material and from examining the figures of the accompanying drawings and as is particularly pointed out in the appended claims.

Figure 1:
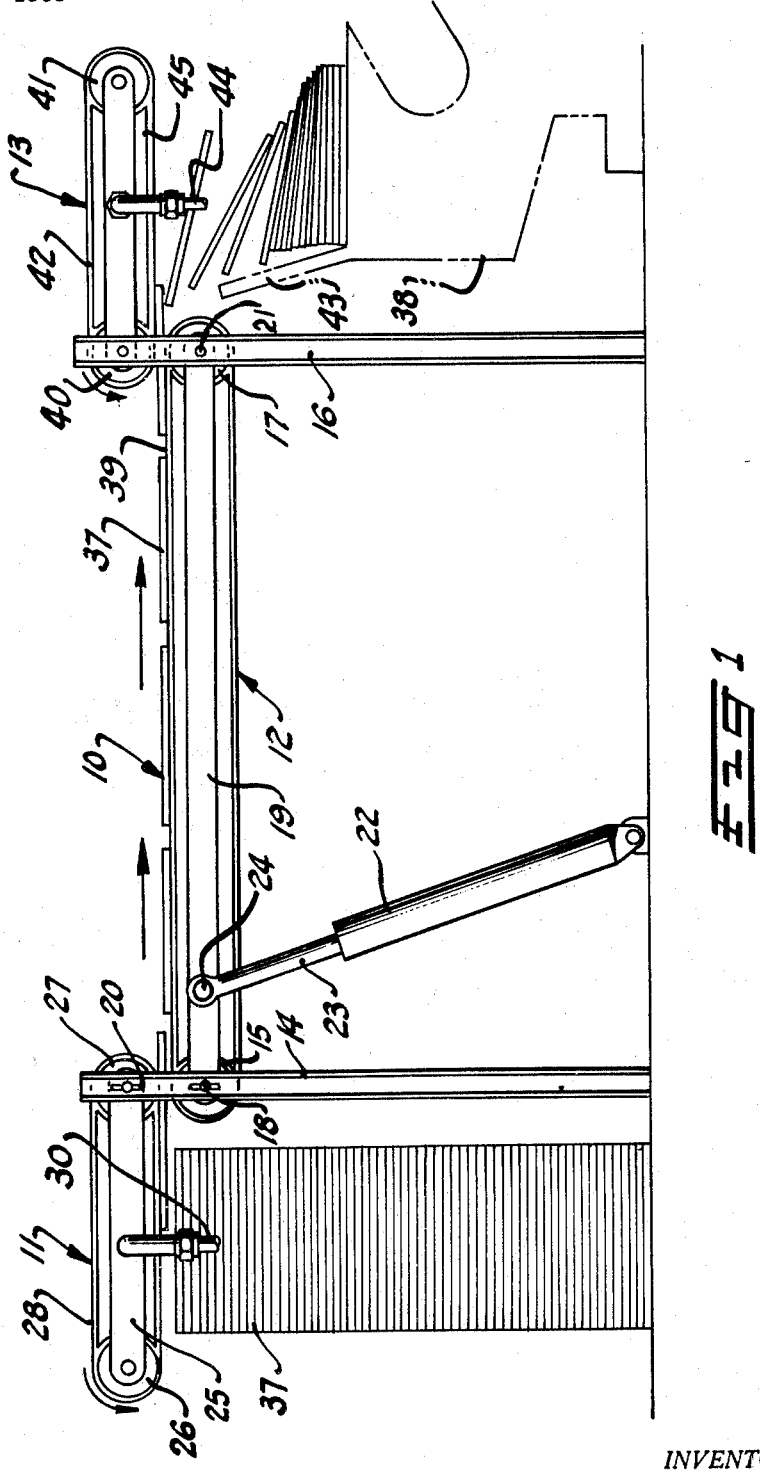
Figure 2:
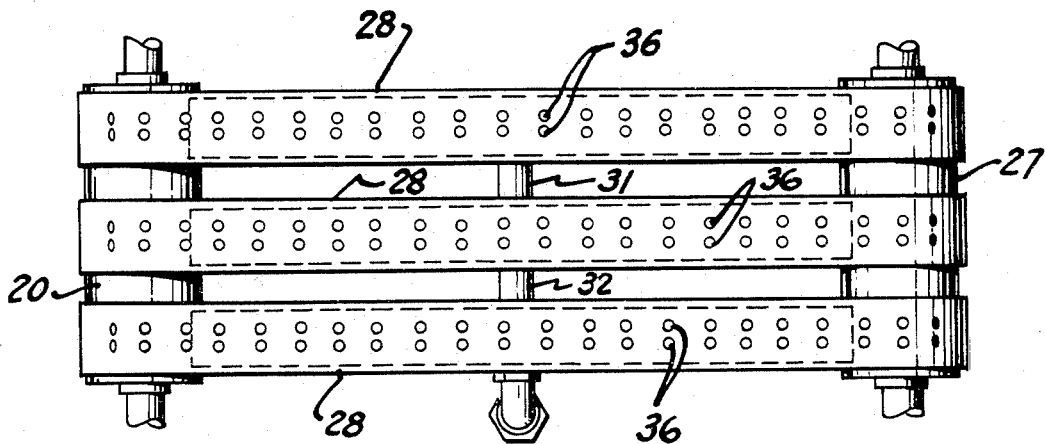
Figure 3:
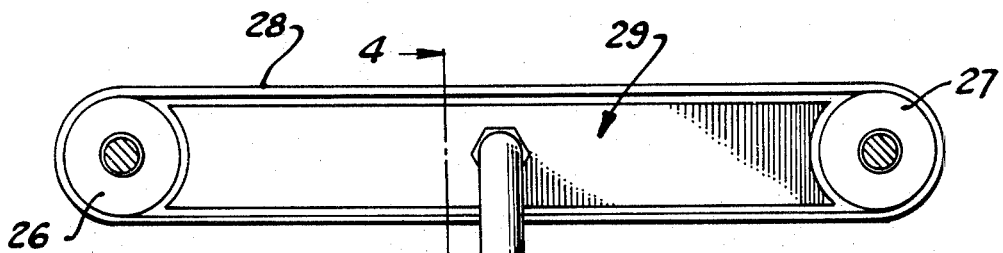

In the drawings:
FIG. 1 is a side view of this invention.
FIG. 2 is a top view of one of the end conveyors of this invention.
FIG. 3 is a side view of FIGURE 2.

Figure 4:
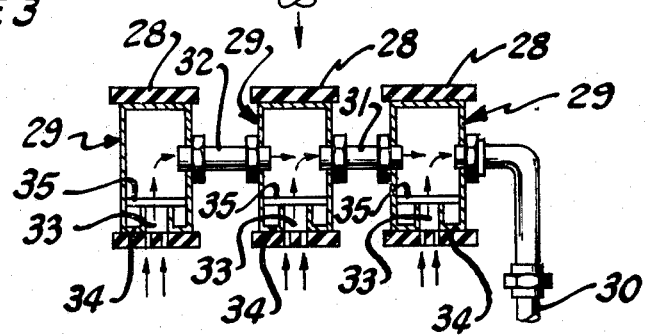
Figure 5:
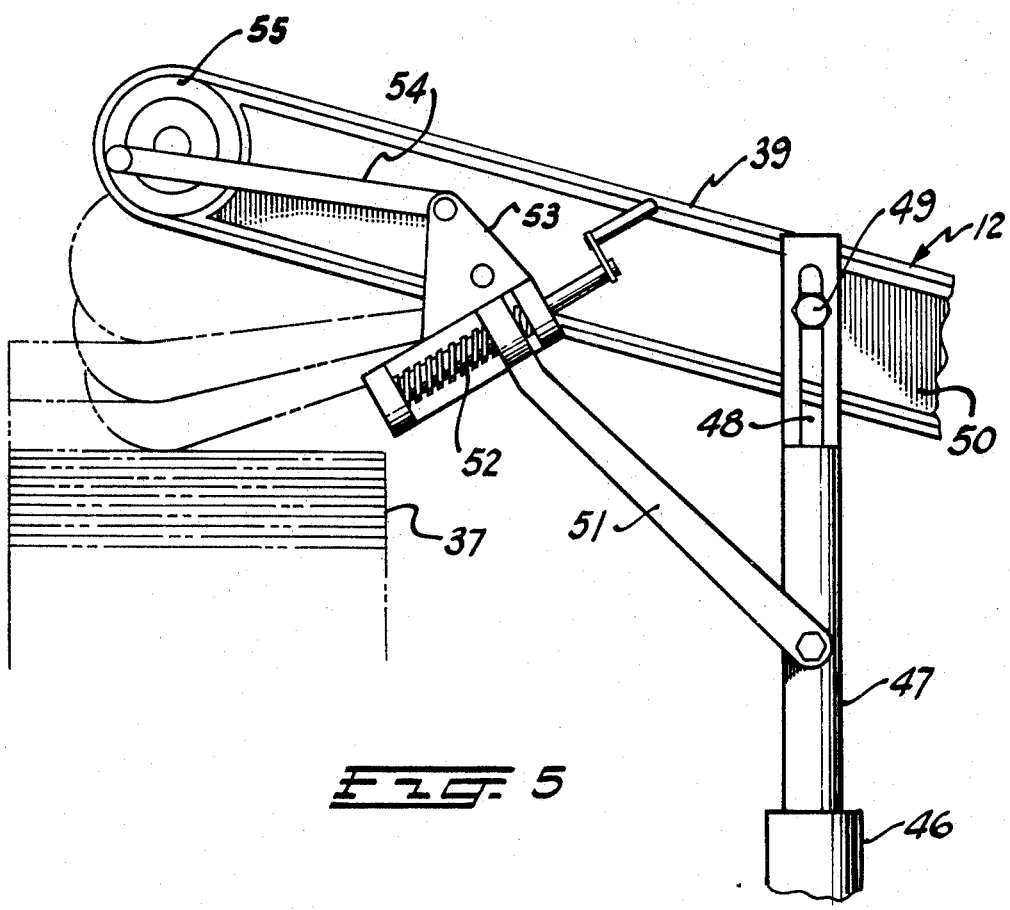

FIG. 4 is a sectional view of a portion of this invention, taken substantially along line 4—4 of FIGURE 3, and viewed in the direction indicated by the arrows.
FIG. 5 is an optional form of construction of one detail of this invention.

In the several views of the drawings, like parts of this invention are indicated by like reference numbers.

The reference number 10 indicates this invention in its entirety.

The invention consists of a pickup conveyor 11, a transporting conveyor 12, and a disposing conveyor 13. One end of the aforesaid transporting conveyor 12 is supported by two vertically disposed steel channels 14 that are located one at each end of the pulleys 15. Like vertically disposed steel channels 16 are located one at each end of the power driven pulleys 17 at the other end of the conveyor. Only one of each of the aforesaid channels 14 and 16 is visible in FIGURE 1 of the accompanying drawings. The pulleys 15 are mounted on a laterally disposed shaft 18 that projects outward beyond each end of the pulley and on through one end of one of the horizontally disposed bars 19, then on through the elongated opening 20 in one of the aforesaid channels 14. The aforesaid pulleys 17 are likewise supported by shaft 21 at the other end of the aforesaid transporting conveyor 12. The detailed construction of this portion of this invention is not shown for reasons of clarity since it is well known to those experienced in the art of conveyor construction. For the same reason, the electric motor that rotates the aforesaid pulleys 17 is likewise left out of the figures of the accompanying drawings.

A hydraulic jack 22 has its outer end of its piston rod 23 swingably connected by the pin 24 to one of the aforesaid bars 19, the connection being made near the pickup end of the conveyor 12. A second hydraulic jack is likewise connected to the other one of the aforesaid bars 19 of which there are obviously two, one on each side of the conveyor 12. The purpose of the two jacks 22 is obviously to raise and lower the pickup end of the often mentioned transport conveyor 12 as well as the aforesaid pickup conveyor 11. The pickup conveyor 11 consists of two horizontally disposed supporting bars 25, one of which supports each end of the free-turning pulleys 26 and the power driven pulleys 27 over which rotates the plurality of laterally spaced belts 28. A rectangular metal box 29 is located within the confines of the aforesaid conveyor belts 28 in the manner shown in FIGURES 1, 2, 3, and 4 of the accompanying drawings. The purpose of each box 29 is to provide a means of distribution of the suction that is generated by a vacuum pump secured by the pipe 30 that has its lower end secured to one of the aforesaid boxes 29. The boxes are connected together by means of connecting pipes 31 and 32, as one can see by looking at FIGURES 2 and 4 of the drawings. Each box is provided with a plurality of spaced openings 33 in the bottom 34. Each box is likewise provided with a plurality of laterally disposed braces 35 that prevent the vacuum from spreading or closing the sides of each box when this invention is in operation. The aforesaid belts 28 are all provided with a plurality of openings 36 in order that, when the belts pass under the openings 35 in the bottom of each one of the boxes 29, the vacuum in each box will pick up and hold sheets of any material that is being conveyed by this invention from a stack of the sheets 37 to a printing press or other machine 38 until the sheets reach the center of the aforesaid vertically disposed channels 14. At this point the vacuum will automatically be shut off, thereby permitting the aforesaid sheets of material to move on top of the conveyor belts 39 that encompass in part the already mentioned pulleys 15 and 17. The sheets of material will be picked up by a vacuum when they reach the center of the aforesaid vertically disposed channels 16.

Continuing to look at FIGURE 1 of the accompanying drawings it will be seen that the aforesaid disposing conveyor 13 is identical in construction to that of the already described pickup conveyor 11 except for the numbering of the different parts of the conveyor. The disposing conveyor embodies a free-turning pulley 40, a power driven pulley 41 and a plurality of conveyor belts 42 that are adapted to pick up and hold the aforesaid sheets of material 37 until the sheets are over the center of the hopper 43 of the aforesaid printing press or other machine 38. The vacuum inlet pipe of the disposing conveyor 13 is indicated by the reference number 44 and the rectangular metal boxes through which the vacuum is created are indicated by the reference number 45, although only one of the boxes is visible in the drawings.

Although it is not visible in any of the views of the accompanying drawings, the aforesaid transporting conveyor 12 has a plurality of belts 39 that are identical to those of both the aforesaid pickup conveyor 11 and the disposing conveyor 13. The transport conveyor 12 can be provided with a vacuum system similar to that described in detail for the pickup conveyor 11. None of the details of this vacuum system (for conveyor 12) are shown in any of the views of the drawings.

Clearly shown in FIGURE 5 of the accompanying drawings is an alternate form of mechanism which may be adapted to the receiving end of the aforesaid transporting conveyor 12 for picking up the sheets of material 37 from a stack of the sheets when the sheets are small in size and the pickup conveyor 11 can be dispensed with. In this form of the invention, the vertically disposed supports are in the form of hydraulic jacks 46 (one shown in FIGURE 5), each one of which has a piston rod 47 in the upper end of which is located an elongated opening 48 through which is located a bolt 49 that projects out from the side of the outside one of the rectangular metal vacuum boxes 50. An angularly disposed support 51 has its lower end bolted to the aforesaid piston rod 47 and its other end adapted to the hand operated screw 52 which supports structure embodying a triangular gusset plate 53. An arm 54 is connected to both the aforesaid gusset plate 53 and the pulleys 55 of the conveyor 12 for the purpose that is so obvious from examination of the aforesaid FIGURE 5 of the drawings as to require no explanation of its working whatsoever.

Although it is not shown in detail in any of the views of the accompanying drawings the aforesaid pickup conveyor 11 is suitably connected by mechanism to the aforesaid transporting conveyor in order that the invention will automatically adjust itself to the top sheet of material of the stacked material as the height of the stack decreases.

FIGURE 1 of the drawings of this invention is self-explanatory as to the way this combination conveyor feeder and loader of sheet material works. The invention is subject to any and all changes in detail construction and/or modifications one may care to make in the same in so long as the changes and/or modifications fall within the scope and intent of the appended claims. For example, the plurality of belts used on each conveyor may, if so desired, be replaced with a single belt for each conveyor. The vacuum system for each conveyor can be made to operate as a single unit by connecting the same together with a single control, if it is so desired.

What I now claim as new and desire to secure by Letters Patent is:

1. A combination conveyor feeder and loader of sheet material comprising a pickup conveyor, a transporting conveyor, and a disposing conveyor, adapted to pick up sheets of material from a stack of the sheets and to transport the said sheets by the said transporting conveyor to the said disposing conveyor which will drop the said sheets of material into any desired hopper, each conveyor consists of a plurality of free-turning pulleys mounted end to end on a single shaft; and one or more power driven pulleys likewise mounted end to end on a shaft that is connected to a source of power; and a plurality of belts encompassing in part each of the said pulleys, the said belts being equally spaced in horizontal spaced relation to one another, wherein the power driven pulleys of the said pickup conveyor are located directly over the free-turning pulleys of the said transporting conveyor, and the said free-turning pulleys of the said disposing cnoveyor are located directly over the power driven pulleys of the said transporting conveyor.

2. The invention of claim 1, wherein the receiving end of the said transporting conveyor is provided with two hydraulic jacks, one mounted on each side of the said transporting conveyor for the purpose of raising and lowering the said receiving end of the said transporting conveyor, a vertical support for each end of the shaft of said receiving end of the transporting conveyor, each vertical support having an elongated opening through which the corresponding end of said shaft extends to permit raising and lowering of the receiving end of said transporting conveyor.

3. The invention of claim 2, wherein both the said pickup conveyor and the said disposing conveyor are provided with a rectangular longitudinally disposed metal box between each of the said belts, each box being connected to a vacuum pump by pipes, and each said box and each said belt being provided with a plurality of openings therein so that a vacuum will hold the sheet material being picked up, transported, and disposed of by the said conveyors.

References Cited

UNITED STATES PATENTS

| | | | |
|---|---|---|---|
| 3,378,251 | 4/1968 | Donabin | 271—3 |
| 3,406,966 | 10/1968 | Walton | 271—74 |

RICHARD E. AEGERTER, Primary Examiner